United States Patent [19]

Suzuki

[11] 4,138,701
[45] Feb. 6, 1979

[54] CASSETTE EJECTOR FOR TAPE RECORDER WITH BOTH PLAY AND EJECTION INHIBIT

[75] Inventor: Katsuo Suzuki, Hamamatsu, Japan

[73] Assignee: Nippon Gakki Seizo Kabushiki Kaisha, Hamamatsu, Japan

[21] Appl. No.: 843,297

[22] Filed: Oct. 18, 1977

[30] Foreign Application Priority Data

Oct. 20, 1976 [JP] Japan .................. 51-140790[U]
Oct. 20, 1976 [JP] Japan .................. 51-140791[U]

[51] Int. Cl.² .................. G11B 15/04; G11B 15/18
[52] U.S. Cl. .................................. 360/96; 360/137
[58] Field of Search ............. 360/96, 137, 105, 93, 360/94, 95

[56] References Cited

U.S. PATENT DOCUMENTS

| | | | |
|---|---|---|---|
| 3,781,016 | 12/1973 | Benton | 360/96 |
| 3,849,799 | 11/1974 | Nakamichi | 360/96 |
| 3,870,247 | 3/1975 | Carisey | 360/96 |
| 3,875,590 | 4/1975 | Mandish | 360/96 |
| 3,877,075 | 4/1975 | Watanabe | 360/96 |
| 3,913,136 | 10/1975 | Kelch | 360/96 |
| 3,939,492 | 2/1976 | Takeda | 360/96 |
| 3,996,618 | 12/1976 | Suzuki | 360/96 |
| 4,017,902 | 4/1977 | Sato | 360/96 |

FOREIGN PATENT DOCUMENTS 2529813  1/1976  Fed. Rep. of Germany ............. 360/96

*Primary Examiner*—Jay P. Lucas
*Attorney, Agent, or Firm*—C. Bruce Hamburg

[57] ABSTRACT

A cassette tape recorder includes operating buttons for controlling the functions of the tape recorder, a cassette ejection button for exposing a cassette accommodating section having a cover, and an arresting member interlocked with the operating buttons and ejection buttons. The arresting member selectively hinders the operation of the ejection button when any of the operating buttons is pushed to put the tape recorder in a tape running mode and the operation of the operating buttons when the cassette accommodating section is exposed, thereby providing a foolproof mechanism for the cassette tape recorder.

5 Claims, 5 Drawing Figures

CASSETTE EJECTOR FOR TAPE RECORDER WITH BOTH PLAY AND EJECTION INHIBIT

BACKGROUND OF THE INVENTION

This invention relates to cassette tape recorders using a magnetic tape installed in a cassette which includes a pair of reels to mount the tape.

In the cassette tape recorder of this type, its cassette is automatically loaded thereinto when the cassette is placed in a cassette accommodating section provided under a cover body thereof and the cover body is closed. Switches in an electrical circuit carrying out the tape running operations with various function controlling buttons for tape running control are operated to cause the recorder to carry out its operation in a desired mode, and upon operation of the ejection button the cover body is opened to take out the cassette.

With such a conventional cassette tape recorder, it will be feared that the cover body is opened by operating the ejection button by mistake during the tape running operation resulting in damage to the tape or the capstans. In other words, the ejection button allows unintended and harmful operation thereof. Unnecessary tape running operation can be also effected upon mistaken operation of the button when the cover body is opened or the cassette is unloaded, in other words, the tape running system can be operated unintendedly or untimely.

These problems are especially serious in a cassette tape recorder of a type in which the tape running mechanism is controlled electrically and function controlling buttons do not operate such mechanism directly but operate it through switches in electric circuits for controlling the tape running mechanism. In such a cassette tape recorder, a lock mechanism for the cassette ejection button or other function controlling buttons requires rather complicated structure.

SUMMARY OF THE INVENTION

It is, therefore, an object of the invention to provide a cassette tape recorder embodying a foolproof mechanism for function controlling buttons thereof.

It is another object of the invention to provide a cassette tape recorder in which undesirable operation of a cassette ejection button is prevented when a tape is in its running modes.

It is still another object of the invention to provide a cassette tape recorder in which unnecessary operation of function controlling buttons for the tape running mechanism and electric circuits therein is prevented when a cassette accommodating section is opened.

It is further object of the invention to provide a foolproof mechanism suited for a cassette tape recorder in which function controlling buttons operate electric switches only.

Provided according to this invention is a cassette tape recorder in which a cassette is placed in a cassette accommodating section provided under a cover body, and the cassette is automatically loaded thereinto upon closure of the cover body, which recorder comprises switch operating pieces for operating switches in electrical circuits by operation of function controlling buttons; and a stopping member which is arranged for sliding in a direction different from the moving direction of the switch operating pieces and locks a cassette ejection mechanism when moved by the switch operating pieces. Accordingly, the cassette tape recorder thus constructed has an advantage that even if the ejection button is operated with the cassette accommodating section opened, the ejection of the cassette is not effected.

In addition, provided according to the invention is a cassette tape recorder in which when a cassette is placed in a cassette accommodating section provided under a cover body thereof and the cover body is closed, the cassette is automatically loaded thereinto, said recorder comprising: switch operating pieces for carrying out the switching operations of electrical circuits with function controlling buttons for tape running control; a stopping member which is selectively placed in a first state in which the switch operating pieces are allowed to move to the operative position thereof and in a second state in which the switch operating pieces are not allowed to move to the operative position; and a switching mechanism for placing the stopping member in the first state when the cover body is in a close state and in the second state when the cover body is in an open state. According to the cassette tape recorder thus constructed, it is possible to prevent the function controlling buttons from being operated when the cover body is opened.

Furthermore, according to the invention, the aforementioned switching mechanism is so designed as to operate in association with the opening and closing operations of the cover body. Accordingly, the cassette tape recorder thus constructed has a merit that the operation is simplified and the erroneous operation can be prevented.

In addition, according to a preferred embodiment of the invention, a part of the switching mechanism and a part of the ejection mechanism are formed by the same component. Accordingly, the construction of the recorder can be simplified, and the number of components can be reduced.

The novel features which are considered characteristic of this invention are set forth in the appended claims. This invention itself, however, as well as other advantages thereof will be best understood by reference to the following detailed description of illustrative embodiments, when read in conjunction with the accompanying drawings, in which like parts are designated by like reference numerals or characters.

DETAILED DESCRIPTION OF THE INVENTION

Figure 1:
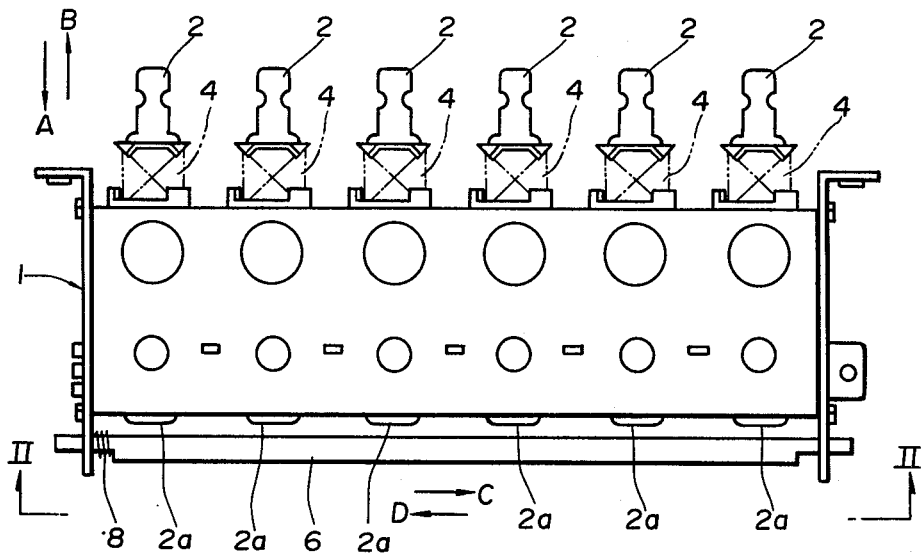
FIG. 1 is a schematic plan view illustrating an operating mechanism of one example of a cassette tape recorder according to this invention.

One preferred example of a cassette tape recorder according to this invention will be described in detail with reference to the accompanying drawings. In the drawings, reference numeral 1 designates the frame of the operating mechanism or switch assembly of the cassette tape recorder. In this frame 1, there are provided operating pieces 2 for recording, rewinding, stopping, playing, fast-forwarding and pause-effecting switches. These switch operating pieces 2 are slidable in the directions of the arrows A and B and caused to slide in the direction of the arrow A against the elastic forces of springs 4 by the operation of respective push buttons 3 provided for recording, rewinding, stopping, playing, fast-forwarding, and pause-effecting, thereby to operate respective switches (not shown) provided in the frame 1 in electrical circuits adapted to select the operations of tape running mechanism and other functions of the tape recorder. The switch operating pieces 2 except the stopping switch operating piece 2 can be pushed in the direction of the arrow A and locked in the pushed position. If under this condition the stopping switch operating piece 2 is pushed in the direction of the arrow A, the remaining switch operating pieces 2 are unlocked and returned to their initial positions with the aid of the elastic forces of the springs 4. Each operating button 3 to act on each switch operating piece 2 is substantially in the form of the letter "L", and its bent section is rotatably secured to a fixed pin 5. Each operating button 3 is biased toward the corresponding operating piece by a leaf spring 37 which is weaker in elastic force than the spring 4 merely to serve for preventing a rattling motion of the button 3 in its rotated operative position. The fixed pin 5 is embedded at a predetermined position on the cassette tape recorder body or chassis (not shown). Similarly, other fixed pins 11, 18, 21, 28 and 35 described later are embedded at respective predetermined positions on the cassette tape recorder.

Figure 2:
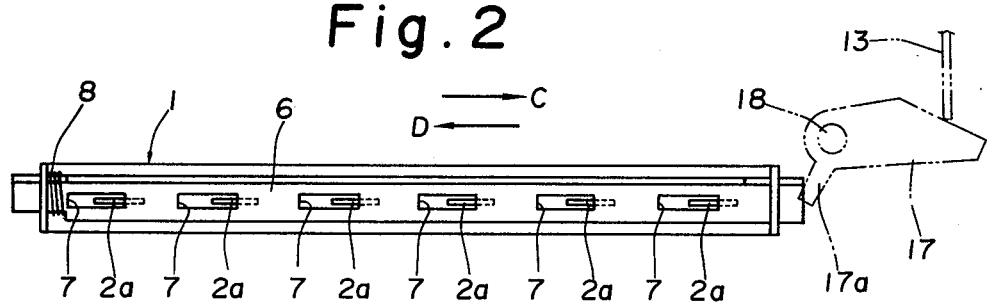
FIG. 2 is a diagram illustrating one state of the operating mechanism viewed along line II—II in FIG. 1 when a cover body is opened.
Figure 3:
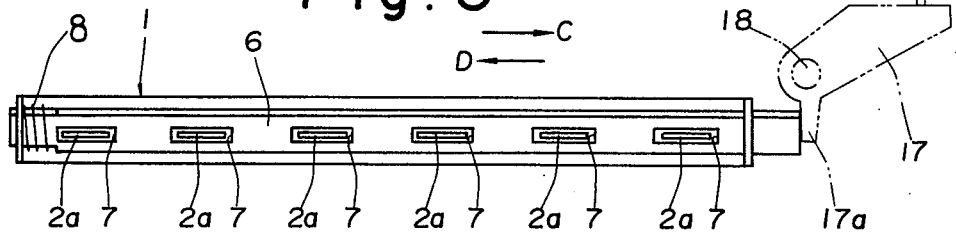
FIG 3 is a diagram illustrating another state of the operating mechanism viewed along line II—II in FIG. 1 when the cover body is closed.

A stopping member 6 is provided in the frame 1 in close but spaced relation to the ends 2a of the switch operating pieces 2 opposite to their ends pushed by the bottons 3. More specifically, the stopping member 6 is arranged for sliding in a direction different from the sliding direction of the switch operating pieces 2, or in a direction perpendicular to the latter direction, or in the directions of the arrows C and D. The cross-section of the stopping member 6 is substantially in the form of the letter "L". Elongated slits 7 are formed at intervals or at predetermined positions in the stopping member 6 as shown in FIGS. 2 and 3. The flat-plate-shaped end portions 2a of the switch operating pieces 2 are engaged with these elongated slits 7 as will be described later. The stopping member 6 is biased in the direction of the arrow C by the elastic force of a spring 8. When the cover 24 is, as described later, opened, the stopping member 6 is slid in the direction of the arrow D against the force of the spring 8, as a result of which it is placed at a position where the slits 7 deviate from the ends 2a of the respective switch operating pieces 2 so that the end portions 2a cannot engage the respective elongated slits 7.

In the drawings, reference numeral 10 designates an "L"-shaped ejection lever, the bent portion of which is pivotally secured to a stationary pin 11. The ejection lever 10 is turned counterclockwise, as viewed in FIG. 5, upon depression of an ejection button (not shown). A predetermined portion of a bar-shaped operating member 13 is rotatably secured through a pin 12 to one end portion of the ejection lever 10. This operating member 13 is arranged for sliding in a substantially vertical direction, but it is energized upwardly by the elastic force of a spring 14. A pin 15 is embedded at the substantially central portion of one side of the operating member 13. A roller 16 is rotatably placed over the pin 15. Bell-cranked rocker 17 is provided below the operating member 13. More specifically, the rocker 17 is pivotally secured to a stationary pin 18 at one end portion. The other end portion of the rocker 17 is abutted against the lower edge of the operating member 13, and a protrusion extended from the aforementioned one end portion thereof is abutted against one end of the stopping member 6. One end portion of an arm 20 is pivotally connected through a pin 19 to the upper end portion of the operating member 13, while the other end portion of the arm 20 is also pivotally secured to a stationary pin 21, to which the upper end portion of a first supporting arm 22 is pivotally secured. The lower end portion of one side of a cover body 24 having a cassette accommodating section is pivotally secured through a pin 23 to the lower end portion of the first supporting arm 22. An elongated slot 25 is formed in a portion of the first supporting arm 22 in the longitudinal direction thereof. A pin 27 embedded at a predetermined position of a second supporting arm 26 is movably fitted into the elongated slot 25. This second supporting arm 26 is substantially in the form of the letter "L", and its bent portion is pivotally secured to a stationary pin 28. The second supporting arm 26 is biased to turn clockwise, as viewed in FIG. 4, by the elastic force of a spring 29 connected thereto. A pin 30 is embedded at one end portion of the second supporting arm 26. Furthermore, the pin 30 is movably inserted into a guide hole 31 formed in the side of the cover body 24. One end portion of a locking arm 33 is pivotally secured through a pin 32 to a predetermined portion of the second supporting arm 26. The locking arm 33 is provided with an elongated slot 34 formed therein in the longitudinal direction. The locking arm 33 is slidably engaged with the elongated slot 34 through a stationary pin 35, and is furthermore abutted against the roller 16 through its lower edge. The lower edge is provided with an engaging section 36 with which the roller 16 is engaged as described later.

Figure 4:
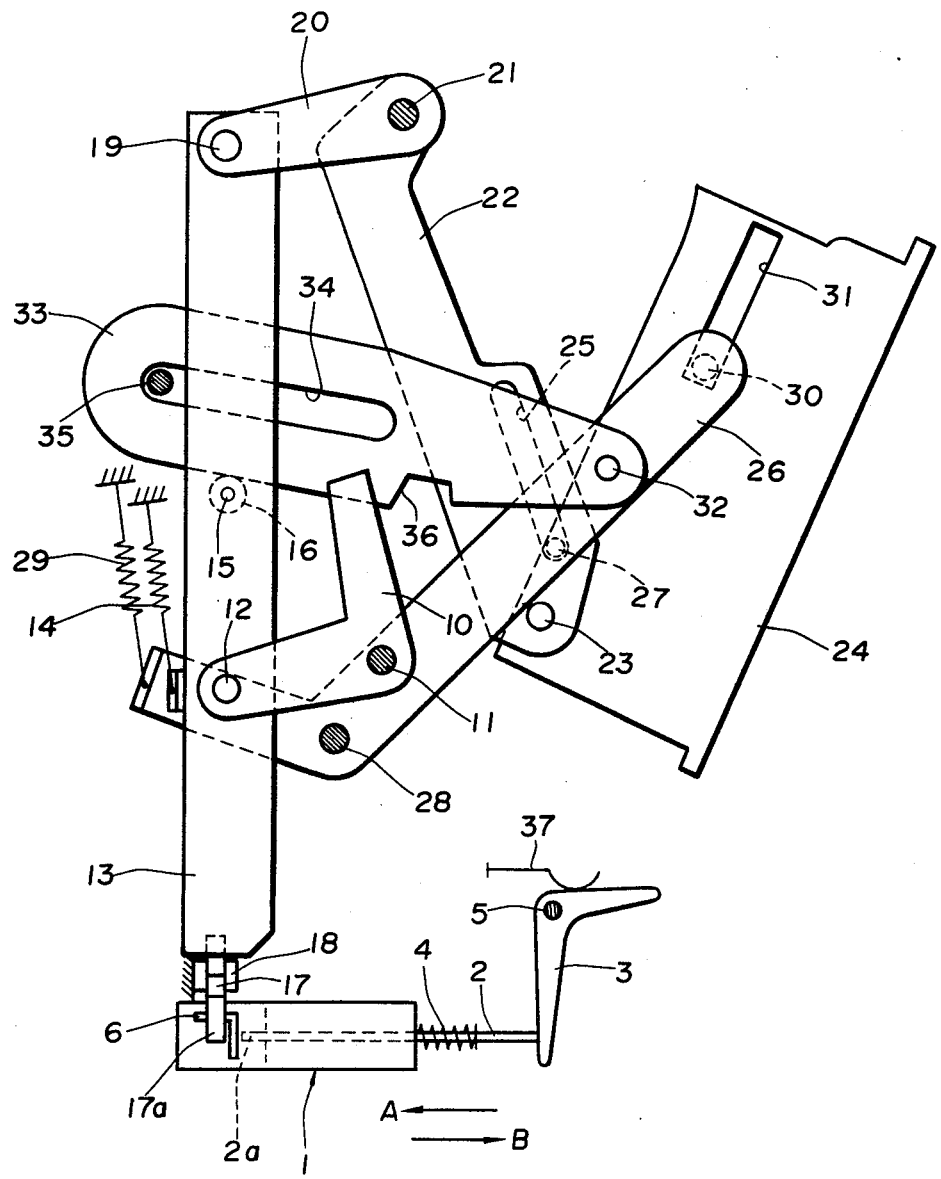
FIG. 4 is a schematic side view illustrating a cover body opening and closing mechanism, in an open state, of the cassette tape recorder according to the invention.

The operation of the device thus constructed will be described. FIGS. 4 and 2 show the state of the device in which the cover body 24 is opened. Under this condition, a cassette (not shown) is placed into the cassette accommodating section of the cover body 24. In this case, upon depression of the cover body 24 leftward, as viewed in FIG. 4, the first supporting arm 22 is turned clockwise around the pin 21, while the second supporting arm 26 is turned counterclockwise around the pin 28 and against the elastic force of the spring 29. As a result, the pins 27 and 30 of the second supporting arm 26 are allowed to slide along the elongated slot 25 and the guide hole 31, respectively, while the locking arm 33 is moved leftward by being guided by the roller 16 and simultaneously turned counterclockwise. When the engaging section 36 of the locking arm 33 reaches the roller 16, the roller 16 together with the operating member 13 is raised by the elastic force of the spring 14 and is finally inserted into the engaging section 36. Thus, the cover body 24 is locked at its closed position, so that the cassette is loaded into the recorder.

In this operation, as a result of the raising of the operating member 13 as was described, the rocker 17 is turned counterclockwise and simultaneously the stopping member 6 is caused to slide in the direction of the arrow C by the elastic force of the spring 8. As a result, the stopping member 6 reaches a position where the respective elongated slots 7 are aligned with the end portions 2a of the switching operating pieces 2 to receive those end portions 2a. Under this condition, a desired one of the recording, playing, fast-forwarding and rewinding operating buttons 3 is operated so that the switch operating piece 2 corresponding to the button is slid in the direction of the arrow A against the elastic force of the spring 4, and is locked there, while the end portion 2a thereof is engaged with the respective elongated slot 7 of the stopping member 6, whereby the desired switching operation can be achieved. Any one of the recording, playing, quick-forwarding and rewinding switching operating pieces 2 thus locked is released by operating the stopping operating button 3.

Figure 5:
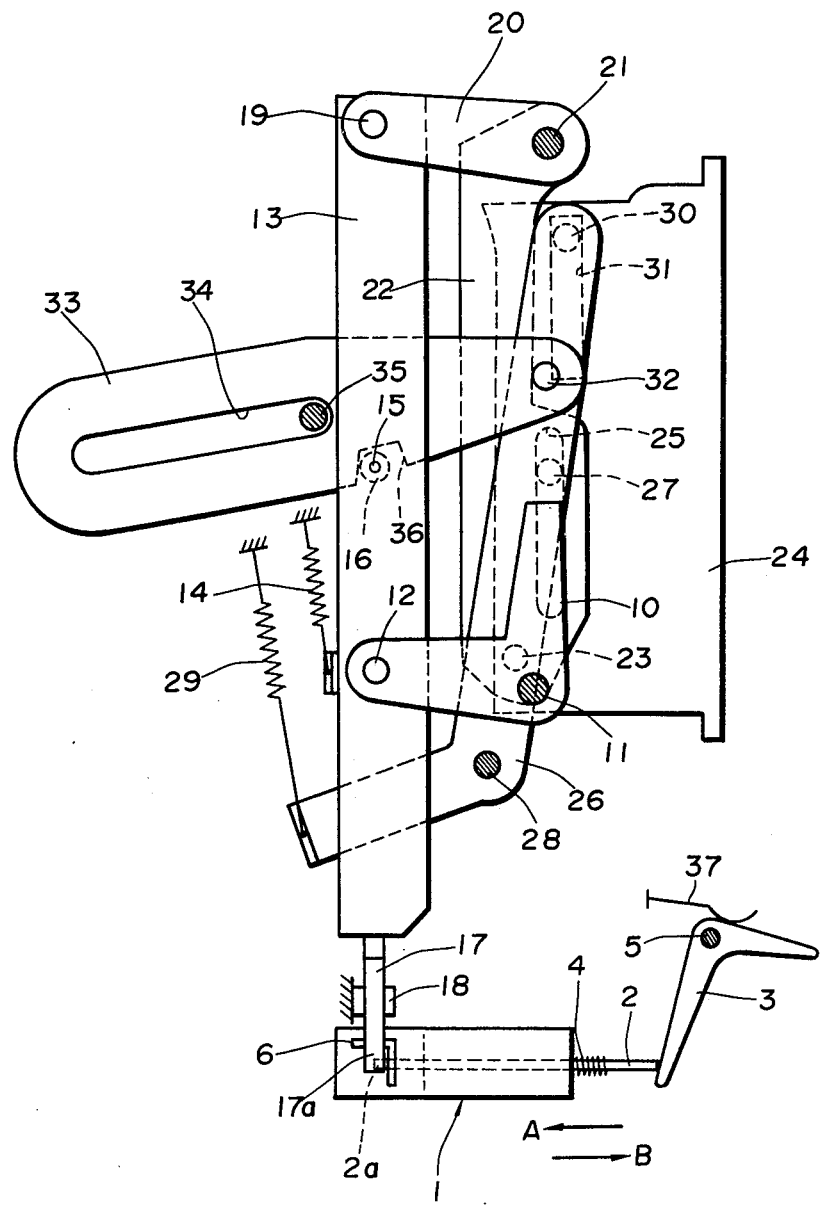
FIG. 5 is a schematic side view illustrating the cover body opening and closing mechanism in a closed state.

In the case where a desired switching operation is carried out by operating a desired one of the recording, playing, fast-forwarding and rewinding operating buttons 3 as described above, the end portion 2a of the switch operating piece 2 corresponding to this switching operation is engaged with the corresponding elongated slot 7 of the stopping member 6. Therefore, the stopping member 6 is engaged with the operating piece 17; that is, the member 6 is locked in a state shown in FIG. 3. Accordingly, even if under this condition the ejection button (not shown) is operated, the operating member 13 is not moved downward; that is, it is impossible to carry out the ejection operation, and the cover body 24 is maintained in a closed state as shown in FIG. 5.

In the case where after the stop condition is established by operating the stopping operating button 3, the ejection lever 10 can be turned counterclockwise by operating the ejection button to take out the cassette by opening the cover body 24. If the ejection button is pushed, the operating member 13 is moved downward against the elastic force of the spring 14 to disengage the roller 16 from the engaging section 36 of the locking arm 33. As a result, the cover body 24 is opened, as shown in FIG. 4, through the steps in opposite order to those in the above described case.

In this operation, by the downward movement of the operating member 13 as was described before, the rocker 17 is turned clockwise, as viewed in FIG. 3, against the elastic force of the spring 8, and is urged to the position shown in FIG. 2. Simultaneously, the stopping member 6 is slid in the direction of the arrow D against the force of the spring 8, and is therefore urged to the position where the end portions 2a of the switching operating pieces 2 cannot engage the elongated slots 7 as shown in FIG. 2.

In the above-described example, the rocker 17 is operated through the operation of the operating member 13; however, it should be noted that the operation thereof is not limited thereto or thereby. That is, it is possible that, for instance, the ejection lever 10 is so shaped as to enable the lower end thereof to abut against the rocker 17. Then the operating piece 17 is operated directly by the ejection lever thus shaped.

Further in the above example, the cassette accommodating section is provided in the cover body 24 thereof. However it is also possible to locate such section under the cover body which is designed to serve only as a lid for that section.

As is apparent from the above description, according to this invention, in the case when any of the switch operating pieces adapted to carry out the switching operations of the switches in the electrical circuits is operated by operating the corresponding operating button for tape running control, the ejection mechanism of the cover body defining the cassette accommodating section is locked in association with this operation. Therefore, even if the ejection button is operated by mistake during the tape running period, the ejection operation is not carried out. Accordingly, trouble such as damage to the tape or the capstans by the sudden ejection of the cassette during the tape running operation can be prevented.

Furthermore, according to this invention, when the cover body having a cassette accommodating section is opened, the operating buttons for tape running control are all locked. Accordingly, even if, when the cover body is opened, the operating buttons for tape running control are operated, the switch operating pieces adapted to operate the switches in the electrical circuits selecting the operations concerning the tape running will never be operated; that is, the tape stopping system can be maintained in a stop mode.

In addition, according to the invention, the operating buttons for tape running control are locked or released in association with the opening and closing operations of the cover body. This means that the locking and unlocking control of the operating buttons for tape running control can be effected merely by opening and closing the cover body. Thus, the operation of the cassette tape recorder is considerably simple, and the erroneous operation thereof can be positively prevented.

Moreover, according to the invention, a part of the mechanism for locking the operating buttons for tape running control and a part of the ejection mechanism are formed by the same component, and therefore the construction is simplified and the number of components is reduced.

What is claimed is:

1. A cassette tape recorder comprising:
    a cassette accommodating section having a movable cover and receiving a cassette therein;
    a plurality of operating members arranged parallel with each other in a row and movably in a substantially same direction between operative and inoperative positions for controlling functions of said tape recorder.
    frame means for movably supporting said plurality of operating members;
    cassette ejection means capable of being actuated for opening said cover to expose said cassette accommodating section for insertion and extraction of the cassette; and
    stopping means comprising a unitary member supported on said frame means to extend in a direction substantially perpindicular to said operating members in said row and coupled to said ejection means, said stopping means being movable in a direction crossing the moving direction of said operating members to selectively occupy, when said ejection means is not actuated, a first position where said stopping means is locked by at least one of said operating members which extends into the moving path of said stopping means in the operative position thereof so as to inhibit the actuation of said ejection means and, when said ejection means is actuated, a second position where said stopping means is located in the moving path of said at least one operating member when all of said operating members are in the inoperative positions so as to inhibit the movement of said one operating member to the operative position.

2. A cassette tape recorder as claimed in claim 1, in which said stopping means comprises a bar-shaped stopping member having slots corresponding to end portions of respective said operating members, the operating members being slidably supported in said frame, said stopping member being slidably arranged in a direction perpendicular to the sliding direction of said operating members and being locked at said first position by inserting at least one of the end portions of said operating members into the corresponding slot provided in said stopping member.

3. A cassette tape recorder as claimed in claim 1, in which said ejection means has an ejection lever and another operating piece which is turned through a predetermined angle in a predetermined direction upon operation of said ejection lever, and said stopping member is biased in a predetermined direction by a spring to abut against said another operating piece, said stopping member being so designed that said members stops said operating piece to turn in the predetermined direction under the condition that said stopping member is at said first position and is locked in a place by said operating members, said stopping member allows said another operating piece to turn in the predetermined direction under the condition that said stopping member is at said first position but is not locked in place by said operating members, and said stopping member is moved toward said second position from said first position against the force of said spring by being depressed by said another operating piece when said another operating piece is turned in the predetermined direction.

4. A cassette tape recorder as claimed in claim 3, in which said ejection means comprises a roller which can be engaged with and also disengaged from an engaging section provided in an arm constituting a part of an opening and closing mechanism of said cover, said roller being biased in a predetermined direction by a spring to abut against said arm, and in which upon closure of said cover said roller is caused to roll along said arm to engage said engaging section thereby to lock said cover in a closed state, and upon operation of said ejection lever said roller is moved in a predetermined direction to disengage from said engaging section thereby to release the locking of said cover.

5. A cassette tape recorder as claimed in claim 1, comprising a switching mechanism, said switching mechanism comprising a first member operating in association with the opening and closing operation of said cover and a second member operating in association with the operation of said first member, said stopping means comprising a stopping member and said stopping member being biased in a predetermined direction by a spring to abut against said operating member, said stopping member being placed into said second position from said first position by being depressed by said second member when said cover is opened.

* * * * *